United States Patent
Aubert

(10) Patent No.: US 9,100,258 B2
(45) Date of Patent: Aug. 4, 2015

(54) MIMO RECEIVER USING LATTIC REDUCTION AND K-BEST DETECTION

(75) Inventor: Sébastien Aubert, Nice (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/116,290

(22) PCT Filed: May 18, 2012

(86) PCT No.: PCT/EP2012/002140
§ 371 (c)(1),
(2), (4) Date: Dec. 19, 2013

(87) PCT Pub. No.: WO2012/156096
PCT Pub. Date: Nov. 22, 2012

(65) Prior Publication Data
US 2014/0185716 A1    Jul. 3, 2014

Related U.S. Application Data

(60) Provisional application No. 61/500,435, filed on Jun. 23, 2011.

(30) Foreign Application Priority Data

May 19, 2011 (EP) .................................. 11368020

(51) Int. Cl.
*H04L 1/02* (2006.01)
*H04L 27/26* (2006.01)
(Continued)

(52) U.S. Cl.
CPC ...... *H04L 27/2649* (2013.01); *H04L 25/03216* (2013.01); *H04L 25/03242* (2013.01); *H04B 7/0697* (2013.01); *H04L 25/0246* (2013.01); *H04L 25/03968* (2013.01)

(58) Field of Classification Search
CPC ................................ H04L 1/0618; H04L 1/06
USPC .................. 375/267, 260, 340, 341, 342, 347
See application file for complete search history.

(56) References Cited

U.S. PATENT DOCUMENTS

2008/0153444 A1   6/2008 Chen et al.
2009/0110120 A1*  4/2009 McNamara et al. ........... 375/340
2014/0254727 A1*  9/2014 Kim et al. ...................... 375/340

FOREIGN PATENT DOCUMENTS

EP     2 458 747 A1    5/2012

OTHER PUBLICATIONS

B.M. Hochwald, et al.; "Achieving near-capacity on a multiple-antenna channel"; Communications, IEEE Transactions; vol. 51, No. 3, Mar. 2003; pp. 389-399.

(Continued)

*Primary Examiner* — Khai Tran
(74) *Attorney, Agent, or Firm* — Patent Portfolio Builders PLLC

(57) ABSTRACT

A detection process for a receiver of a wireless communication system based on Multiple-Input Multiple-Output antennas ($n_T$, $n_R$), said receiver processing observations symbols y derived from symbols x transmitted by an emitter through a channel H; characterized in that it involves: —a preprocessing which only depends on the channel H, said preprocessing involving: —a first QRD decomposition (61) for the purpose of decomposing said channel H into two $Q_{ext}$ and $R_{ext}$ matrices, with $Q_{ext}H_{Qext}$=/and $R_{ext}$ being upper triangular; —a lattice reduction (62) for the purpose of generating $Q_{ext}$, $R_{ext}$ and a transformation matrix T; —a second QRD decomposition (63) applied on the matrix $R_{ext}$ $T^{-1}$ for the purpose of generating two matrixes $Q'_{ext}$ and $R'_{ext}$ —a loading phase (64, 65, 66) comprising a linear detection process of the observations y for the purpose of generating a value $x_{center}$; —a neighborhood search (67-70) performed in the Original Domain Neighborhood (ODN) with a search center being equal to the result $x_{center}$ of said loading phase, said neighborhood search determining a limited number of symbols (K-best).

15 Claims, 15 Drawing Sheets

(51) Int. Cl.
*H04L 25/03* (2006.01)
*H04L 25/02* (2006.01)
*H04B 7/06* (2006.01)

(56) References Cited

OTHER PUBLICATIONS

K.W. Wong, et al.; A VLSI Architecture of a K-Best Lattice Decoding Algorithm For MIMO Channels; Circuits and Systems, IEEE International Symposium; vol. 3, May 2002; pp. 273-276.
L. Wang, L. Xu, et al.; "MMSE Soft-Interference-Cancellation Aided Iterative Center-Shifting K-Best Sphere Detection for MIMO Channels," Communications, IEEE; International Conference; May 2008 pp. 3819-3823.
W. Zhang, et al.; "Approaching Optimal Performance by Lattice-Reduction Aided Soft Detectors," Information Sciences and Systems Conference; Mar. 2007; pp. 818-822.
X.-F. Qi, and K. Holt, "A Lattice-Reduction-Aided Soft Demapper for High-Rate Coded MIMO-OFDM Systems"; Signal Processing Letters; IEEE , vol. 14, No. 5; May 2007; pp. 305-308.
D. Wubben, et al.; "Efficient Algorithm for Decoding Layered Space-Time Codes"; Electronics Letters, IEEE. vol. 37, No. 22; Oct. 2001; pp. 1348-1350.
C. Schnorr, et al.; "Lattice basis reduction: improved practical algorithms and solving subset sum problems"; Mathematical Programming, vol. 66; Sep. 1994; pp. 181-199.
L.G. Barbero, et al.; "Fixing the Complexity of the Sphere Decoder for MIMO Detection"; Wireless Communications, IEEE Transactions; vol. 7, No. 6; Jun. 2008; pp. 2131-2142.
3GPP; 3rd Generation Partnership Project; Technical Specification Group Radio Access Network; Evolved Universal Terrestrial Radio Access (E-UTRA); "User Equipment (UE) radio transmission and reception"; (Release 8); 3GPP TS 36.101 V8.8.0; Dec. 2009; pp. 1-160.
International Search Report and Written Opinion of the International Searching Authority issued in corresponding International application No. PCT/EP2012/002140, date of mailing Aug. 20, 2012.
Wübben, Dirk et al., "Near-Maximum-Likelihood Detection of MIMO Systems using MMSE-Based Lattice Reduction," 2004 IEEE International Conference on Communication (ICC), held in Paris, France, vol. 2, Jun. 2004, pp. 798-802, XP010710431, Piscataway, NJ, USA, DOI: 10.1109/ICC.2004.1312611, ISBN: 978-0-7803-8533-7.
International Preliminary Report on Patentability in corresponding International Application No. PCT/EP2012/002140 mailed Nov. 28, 2013.

\* cited by examiner

Algorithm 1: RDN LRA-ZF(MMSE) FNSA K-Best

1. $d = \frac{1}{2}T^{-1}[1+j, \ldots, 1+j]^T$
2. $a = 2scale$
3. $\tilde{z}_{1:n_T} = z_{center,1:n_T}$
4. $z_. = rdn\_generation\{\tilde{z}_{n_T}, N\}$
5. $for\ l = 1:N, do$
6. $\quad D_{tot,l} = |\tilde{R}_{n_T,n_T}(\tilde{z}_{n_T} - z_l)|^2$
7. $end$
8. % Sort the $N$ PED candidates in ascending order, and store the min$\{K,N\}$ lowest
9. $C_{2n_T,1:\min\{K,N\}} = ordered\_candidates_{n_T,1:\min\{K,N\}}$
10. $D_{prev,1:\min\{K,N\}} = ordered\_peds_{n_T,1:\min\{K,N\}}$
11. $for\ n = n_T - 1: -1:1, do$
12. $\quad for\ k = 1:\min\{K,N\}, do$
13. $\quad\quad sum = \sum_{i=n+1}^{n_T}\{\tilde{R}_{n,i}(\tilde{z}_i - C_{2_{i,k}})\}$
14. $\quad\quad z_. = rdn\_generation\left\{\frac{sum}{\tilde{R}_{n,n}} + \tilde{z}_n, N\right\}$
15. $\quad\quad for\ l = 1:N, do$
16. $\quad\quad\quad D_{tot,(k-1)N+l} = D_{prev,k} + |\tilde{R}_{n,n}(z_{center,n} - z_l) + sum|^2$
17. $\quad\quad end$
18. $\quad end$
19. % Sort the $N\min\{K,N\}$ PED candidates in ascending order, and store the min$\{K,N\}$ lowest
21. $\quad C_{2n,n_T,1:\min\{K,N\}} = ordered\_candidates_{n:n_T,1:\min\{K,N\}}$
21. $\quad D_{prev,1:\min\{K,N\}} = ordered\_peds_{n,1:\min\{K,N\}}$
22. $end$
23. $C_{\tilde{x},1:\min\{K,N\}} = TC_{2,1:\min\{K,N\}}$
24. $for\ k = 1:\min\{K,N\}, do$
25. $\quad C_{\hat{x},.,k} = Q_{\xi^{n_T}}\{C_{\tilde{x},k}\}$
26. $end$
27. % Sort the min$\{K,N\}$ candidates in ascending order in the Original Domain RDN LRA-ZF(MMSE) FNSA K-Best algorithm.

Fig. 11

1. $x_{center} = Tz_{center}$
2. $\tilde{x} = x_{center}$
3. $[\tilde{Q}', \tilde{R}'] = QRD\{\tilde{R}T^{-1}\}$
4. $for\ l = 1:|\xi|, do$
5.     $D_{tot,l} = |\tilde{R}'_{n_T,n_T}(\tilde{x}_{n_T} - x_l)|^2$
6. $end$
7. % Sort the $|\xi|$ PED candidates in ascending order, and store the $K$ lowest
8. $C_{x_{n_T,1:K}} = ordered\_candidates_{n_T,1:K}$
9. $D_{prev,1:K} = ordered\_peds_{n_T,1:K}$
10. $for\ n = n_T - 1:-1:1, do$
11.     $for\ k = 1:K, do$
12.         $sum = \sum_{i=n+1}^{n_T}\{\tilde{R}'_{n,i}(x_{center,n} - C_{x_{i,k}})\}$
13.         $for\ l = 1:|\xi|, do$
14.             $D_{tot,(k-1)|\xi|+l} = D_{prev,k} + |\tilde{R}'_{n,n}(x_{center,n} - x_l) + sum|^2$
15.         $end$
16.     $end$
17.     % Sort the $K|\xi|$ PED candidates in ascending order, and store the $K$ lowest
18.     $C_{x_{n:n_T,1:K}} = ordered\_candidates_{n:n_T,1:K}$
19.     $D_{prev,1:K} = ordered\_peds_{n,1:K}$
20. $end$

Fig. 12

| Complex operations | Real operations | MUL |
|---|---|---|
| ADD | 2ADD | 0 |
| ADD | ADD | 0 |
| ADD | ADD | 0 |
| MUL | 4MUL+4ADD | 4 |
| MUL | 2MUL | 2 |
| MUL | 1MUL | 1 |
| DIV | 6DIV+6ADD | 96 |
| DIV | 2DIV | 32 |
| DIV | 1DIV | 16 |
| SQRT | 1SQRT | 32 |

Computational complexities equivalences.

Fig.15

| Technique designation | Corresponding computational complexity in MUL |
|---|---|
| RDN LRA-ZF(MMSE) FNSA | $4N\min\{K,N\}n_T + 6\min\{K,N\}n_T^2 + 4\min\{K,N\}n_R n_T - 4N\min\{K,N\}$ $+ 30\min\{K,N\}n_T + 2\min\{K,N\}n_R + 4 - 32\min\{K,N\}$ |
| ODN LRA-ZF(MMSE) FNSA | $4|\xi|Kn_T + 2Kn_T^2 - 4|\xi|K - 2Kn_T + 4|\xi|$ |
| ODN LRA-ZF(MMSE) FPA | $4|\xi|Kn_T + 2Kn_T^2 - 4|\xi|K - 2Kn_T + 4|\xi|$ |
| ML | $4n_R n_T M^{n_T}$ |

Fig.16

| Technique designation | Corresponding metric |
|---|---|
| ML | $\|y - Hx\|^2, x \in \xi^{n_T}$ |
| ODN naïve FNSA | $\|Q^H y - Rx\|^2, x \in \xi^{n_T}, [Q,R] = QRD\{H\}$ |
| ODN ZF FNSA | $\|R(y_{ZF} - x)\|^2, x \in \xi^{n_T}, [Q,R] = QRD\{H\}$ |
| ODN MMSE FNSA | $(y_{MMSE} - x)^H (H^H H + \sigma^2 I)(y_{MMSE} - x), x \in \xi^{n_T}$ |
| RDN LRA-ZF FNSA | $\|\tilde{R}(z_{LRA-ZF} - z)\|^2, z \in \mathbb{Z}_C^{n_r}, [\tilde{Q}, \tilde{R}] = QRD\{\tilde{H}\}$ |
| RDN LRA-MMSE FNSA | $(z_{LRA-MMSE} - z)^H (\tilde{H}^H \tilde{H} + \sigma^2 T^H T)(z_{LRA-MMSE} - z), z \in \mathbb{Z}_C^{n_r}$ |
| ODN LRA-ZF FPA | $\|(Q_{T^{-1}})^H z_{LRA-ZF} - (R_{T^{-1}})x\|^2, x \in \xi^{n_T}, [Q_{T^{-1}}, R_{T^{-1}}] = QRD\{T^{-1}\}$ |
| ODN LRA-MMSE FPA | $\|(Q_{T^{-1}})^H z_{LRA-MMSE} - (R_{T^{-1}})x\|^2, x \in \xi^{n_T}, [Q_{T^{-1}}, R_{T^{-1}}] = QRD\{T^{-1}\}$ |
| ODN LRA-ZF FNSA | $\|\tilde{R}'(x_{LRA-ZF} - x)\|^2, x \in \xi^{n_T}, [\tilde{Q}', \tilde{R}'] = QRD\{\tilde{R}T^{-1}\}, [\tilde{Q}, \tilde{R}] = QRD\{\tilde{H}\}$ |
| ODN LRA-MMSE FNSA | $(x_{LRA-MMSE} - x)^H T^{-H}(\tilde{H}^H \tilde{H} + \sigma^2 T^H T) T^{-1}(x_{LRA-MMSE} - x), x \in \xi^{n_T}$ |

Fig.17

| Technique | SNR loss (QPSK) | | | | SNR loss (16-QAM) | | | |
|---|---|---|---|---|---|---|---|---|
| | K=1 | K=2 | K=3 | K=4 | K=1 | K=2 | K=4 | K=16 |
| RDN LRA-MMSE FNSA | 1.61 | 0.18 | 0.10 | 0.08 | 2.22 | 0.71 | 0.28 | 0.28 |
| ODN LRA-MMSE FPA | >7.5 | >4.6 | 2.26 | 0.88 | >9.5 | >7.8 | 5.66 | 2.13 |
| ODN LRA-MMSE FNSA | >7.4 | >4.4 | 1.76 | 0.33 | >9.4 | >7.8 | 5.71 | 0.97 |

ODN LRA-MMSE FPA and reference RDN LRA-MMSE FNSA and ODN LRA-MMSE FNSA compared to ML.

Fig. 18

| Technique | MUL (QPSK) | | | | MUL (16-QAM) | | | |
|---|---|---|---|---|---|---|---|---|
| | K=1 | K=2 | K=3 | K=4 | K=1 | K=2 | K=4 | K=16 |
| RDN LRA-MMSE FNSA | 336 | 652 | 698 | 1284 | 336 | 652 | 1284 | 1600 |
| ODN LRA-MMSE FPA | 88 | 160 | 232 | 304 | 280 | 496 | 928 | 3520 |
| ODN LRA-MMSE FNSA | 88 | 160 | 232 | 304 | 280 | 496 | 928 | 3520 |
| ML | | 16384 | | | | 4194304 | | |

RDN LRA-MMSE FNSA ODN LRA-MMSE FPA ODN LRA-MMSE FNSA and ML computational complexities in MUL.

MIMO RECEIVER USING LATTIC REDUCTION AND K-BEST DETECTION

TECHNICAL FIELD

The invention relates to the field of wireless communication and more particularly to a process for performing near-ML detection in a receiver of a wireless MIMO communication system.

BACKGROUND ART

Wireless communication based on multiple antennas is a very promising technique which is subject to extensive investigations so as to take into advantage of the significant increase of data rate which may be obtained by such technique.

FIG. 1 illustrates a basic 2×2 multiple-Input Multiple Output (MIMO) spatial multiplexing communication between an emitter 10 and a receiver 20, and the processing of a single data flow represented by reference 1 which is divided into two distinctive data streams 2 and 3 by means of a multiplexer 15 and each subflows are then being processed by a respective modulator and RF circuit (resp. 13 and 14) before being conveyed to two transmit antennas 11 and 12.

On the receiver side, two antennas 21 and 22 provides two RF signals which are received by receiver 20 which performs RF reception, detection and then demodulation of the two data streams before demultiplexing it into one single data stream.

The MIMO configuration—with specific schemes—allows to get rid of the different obstacles (such as represented by obstacles 28 and 29).

Let us introduce a $n_T$—transmit and $n_R$—receive $n_T \times n_R$ MIMO system model such as: y=Hx+n, where y is the receive symbols vector, H the channel matrix, x the transmit symbols vector that is independently withdrawn from a constellation set $\xi$ and n an additive white Gaussian noise. A well-known technique used for determining the optimal Maximum Likelihood (ML) estimate $\hat{x}_{ML}$ by avoiding an exhaustive search is based on the examination of the sole lattice points that lie inside a sphere of radius d. That technique is denoted as the Sphere Decoder (SD) technique and, starting from the ML equation $$\hat{x}_{ML} = \underset{x \in \xi^{n_T}}{\operatorname{argmin}} \|y - Hx\|^2, \quad (1)$$

which reads:

$$\hat{x}_{SD} = \underset{x \in \xi^{n_T}}{\operatorname{argmin}} \|Q^H y - Rx\|^2 \leq d^2$$

where H=QR, with the classical QR Decomposition (QRD) definitions, and d is the sphere constraint.

The SD principle has been introduced and leads to numerous implementation problems. In particular, it is a NP-hard Non-deterministic Polynomial-time hard algorithm. This aspect has been partially solved through the introduction of an efficient solution that lies in a so-called Fixed Neighborhood Size Algorithm (FNSA)—commonly denoted as the K-Best—which offers a fixed complexity and possibilities of parallel implementation. However, this known technique leads the detector to be sub-optimal because of a loss of performance in comparison with the ML detector. It is particularly true in the case of an inappropriate K according to the MIMO channel condition number since, unfortunately, it might occur that the ML solution might be excluded from the search tree.

In the following of the description below, and since the complexity is fixed with such a detector, the exposed optimizations will induce a performance gain for a given Neighborhood size or a reduction of the Neighborhood size for a given Bit Error Rate (BER) goal. Some classical and well-known optimizations in the FNSA performance improvement lie in the use of the Sorted QRD (SQRD) at the preprocessing steps, the Schnorr-Euchner (SE) enumeration strategy and the dynamic K-Best at the detection step.

However, although a Neighborhood study remains the one and only solution that achieves near-ML performance, it may lead to the use of a large size Neighborhood scan that would correspond to a dramatic increase of the computational complexity. This point is particularly true in the case of high order modulations.

Also, the SD must be fully processed for each transmit symbols vector detection over a given channel realization. A computational complexity reduction by considering the correlation between adjacent-channel is not possible, even if the channel may be considered as constant over a certain block code size within the coherence band (time). Consequently, due to the SD's principle itself, the skilled man would have noticed the necessity of reducing the computational complexity of any SD-like detector for making it applicable in the LTE-A context.

Aiming at providing a low-complexity near-ML detector in the case of high modulation orders (16QAM, 64QAM), the Reduced Domain Neighborhood (RDN) Lattice-Reduction-Aided (LRA) K-Best has been disclosed in non published European patent application 10368044.3, entitled <<Detection process for a receiver of a wireless MIMO communication system>>, filed on 30 Nov. 2010 by the Applicant of the present application, and which is herein incorporated by simple reference.

The above mentioned non published application teaches a Neighborhood size limitation on the basis of a specific ML metric formulation that makes the SD apply a Neighborhood study in a modified constellation domain, a so-called Reduced Domain Neighborhood (RDN). However, the offered performance has been shown to be near-ML, but at the price of a large computational complexity in the QPSK case.

Because the technique which was described in the above mentioned European patent application requires a significant amount of system resources for the purpose of performing the appropriate Neighborhood search within the so-called Reduced Domain Neighborhood (RDN), there is a desire for performing a Neighborhood search with Original Domain Neighborhood (ODN) in some particular cases.

Such is the technical problem solved by the present invention.

SUMMARY OF THE INVENTION

It is an object of the present invention to provide a detection process adapted for a MIMO architecture which achieves powerful near-ML detection.

It is a further object of the present invention to carry out a detection process which is adapted to perform a Neighborhood search within the original domain Neighborhood.

It is still a further object of the present invention to provide an effective process which can adapts the complexity to the level of digital processing resources being available in the system.

These and other objects of the invention are achieved by means of a detection process for a receiver involving the steps of:

performing a preprocessing which only depends on the channel H, said preprocessing involving:

a first QRD decomposition for the purpose of decomposing said channel H into two $Q_{ext}$ and $R_{ext}$ matrices, with $Q_{ext}^H Q_{ext} = I$ and $R_{ext}$ being upper triangular;

a lattice reduction for the purpose of generating $\tilde{Q}_{ext}$, $\tilde{R}_{ext}$ and a transformation matrix T;

a second QRD decomposition applied on the matrix $\tilde{R}_{ext}T^{-1}$ for the purpose of generating two matrixes $\tilde{Q}'_{ext}$ and $\tilde{R}'_{ext}$, performing a loading phase comprising a linear detection process of the observations y for the purpose of generating a value $x_{center}$;

then followed by a neighborhood search which is performed in the Original Domain Neighborhood (ODN) with a search center being equal to the result $x_{center}$ of the loading phase, the Neighborhood search yielding a limited number of symbols (K-best).

In one embodiment, the first QRD decomposition is a SQRD decomposition which is particularly applied to a $H_{ext}$ channel a having a dimension $(n_R+n_T) \times n_T$ which takes into account the noise contribution, that is to say according to the model below from the formula:

$$H_{ext} = \begin{bmatrix} H \\ \sigma I \end{bmatrix}$$

and $$y_{ext} = \begin{bmatrix} y \\ 0 \end{bmatrix}.$$

with $y_{ext}$ having a dimension $n_R+n_T$.

The first SQRD decomposition generates a permutation matrix P that orders the layers in accordance to the noise level.

In one particular embodiment, the linear detection is based on a linear MMSE equalization.

In one particular embodiment, the lattice reduction is based on a Korkine-Zolotareff or Lenstra-Lenstra-Lovasz (LLL) algorithm, generating the following matrices: $\tilde{Q}_{ext}$, $\tilde{R}_{ext}$, T and $T^{-1}$, with T being a transformation matrix which takes into account the permutations already accounted with matrix P, plus the additional changes resulting from the lattice reduction.

The invention also achieves a receiver for a wireless communication system based on Multiple-Input Multiple-Output antennas comprising $n_T$ transmitting antennas and $n_R$ receiving antennas, said receiver processing observations symbols y derived from symbols x transmitted by an emitter through a channel H; characterized in that it involves:

preprocessing means comprising:

means for performing a first QRD decomposition for the purpose of decomposing said channel H into two $Q_{ext}$ and $R_{ext}$ matrices, with $Q_{ext}^H Q_{ext}=I$ and R being upper triangular;

means for performing a lattice reduction for the purpose of generating $\tilde{Q}_{ext}$, $\tilde{R}_{ext}$ and a transformation matrix T;

means for performing a second QRD decomposition applied on the matrix $\tilde{R}_{ext}T^{-1}$ for the purpose of generating two matrixes $\tilde{Q}'_{ext}$ and $\tilde{R}'_{ext}$, means for performing a loading phase comprising a linear detection process of the observations y for the purpose of generating a value $x_{center}$;

means for performing a neighborhood search performed in the Original Domain Neighborhood (ODN) with a search center being equal to the result $x_{center}$ of said loading phase, said neighborhood search determining a limited number of symbols (K-best).

In one embodiment the first QRD decomposition is a SQRD decomposition which is particularly applied to a $H_{ext}$ channel:

$$H_{ext} = \begin{bmatrix} H \\ \sigma I \end{bmatrix}$$

and $$y_{ext} = \begin{bmatrix} y \\ 0 \end{bmatrix}..$$

With $y_{ext}$ having a dimension $n_R \pm n_T$.

At last, the invention achieves a detection process for a receiver of a MIMO wireless communication system, which involves the steps:

a preprocessing only depending on the channel H, said preprocessing involving:

a first QRD decomposition for the purpose of decomposing said channel H into two $Q_{ext}$ and $R_{ext}$ matrices, with $Q_{ext}^H Q_{ext}=I$ and $R_{ext}$ being upper triangular;

a lattice reduction for the purpose of generating $\tilde{Q}_{ext}$, $\tilde{R}_{ext}$ and a transformation matrix T;

Determining whether the digital resources available are superior to one is predetermined level, and if said digital resources are superior to said predetermined level, then executing the process involving the steps of:

applying a second QRD decomposition applied on the matrix $\tilde{R}_{ext}T^{-1}$ for the purpose of generating two matrixes $\tilde{Q}'_{ext}$ and $\tilde{R}'_{ext}$, a loading phase comprising a linear detection process of the observations y for the purpose of generating a value $x_{center}$;

a neighborhood search performed in the Original Domain Neighborhood (ODN) with a search center being equal to the result $x_{center}$ of said loading phase, said neighborhood search determining a limited number of symbols (K-best);

Otherwise executing the process involving the steps of:

a loading phase comprising a linear detection applied on said symbols y in accordance with the result of said lattice reduction for the purpose of generating a value $\tilde{z}_{LRA-MMSE}$ applying a neighborhood search with a search center being equal to the result $\tilde{z}_{LRA-MMSE}$ of said lattice reduction;

Determining the K-Best symbols in accordance with a Partial Euclidean Distance (PED) defined in accordance with the following formula:

$$\|\tilde{R}(\tilde{z}_{LRA-MMSE}-z)\|^2 < d^2$$

detecting each layer and with the result of said detection performing an update of the search center so as to perform detection of the next layer;

multiplying the estimated value $\hat{z}$ by said matrix T so as to generate the is estimated value $\hat{x}$ through an additional quantization step in the original constellation.

The invention is adapted to carry out a User Equipment, such as a mobile telephone.

DESCRIPTION OF THE DRAWINGS

Other features of one or more embodiments of the invention will be best understood by reference to the following detailed description when read in conjunction with the accompanying drawings.

FIG. 11 illustrates one embodiment of an algorithm of a RDN LRA-SF (MMSE) FNSA.

FIG. 12 illustrates one embodiment of an ODN LRA-ZF (MMSE) FNSA.

FIG. 15 illustrates Computational complexities equivalences.

FIG. 16 is a table showing the RDN LRA-ZF(MMSE) FNSA, ODN LRA-ZF(MMSE) FNSA, ODN LRA-ZF (MMSE) FPA and ML formulas.

FIG. 17 summarizes the metric formulas used in both the conventional technique and the proposed solution.

FIGS. 18 and 19 illustrate comparison of the SNR loss for both the QPSK and the 16QAM between the different techniques.

DESCRIPTION OF THE PREFERRED EMBODIMENT

Figure 1:
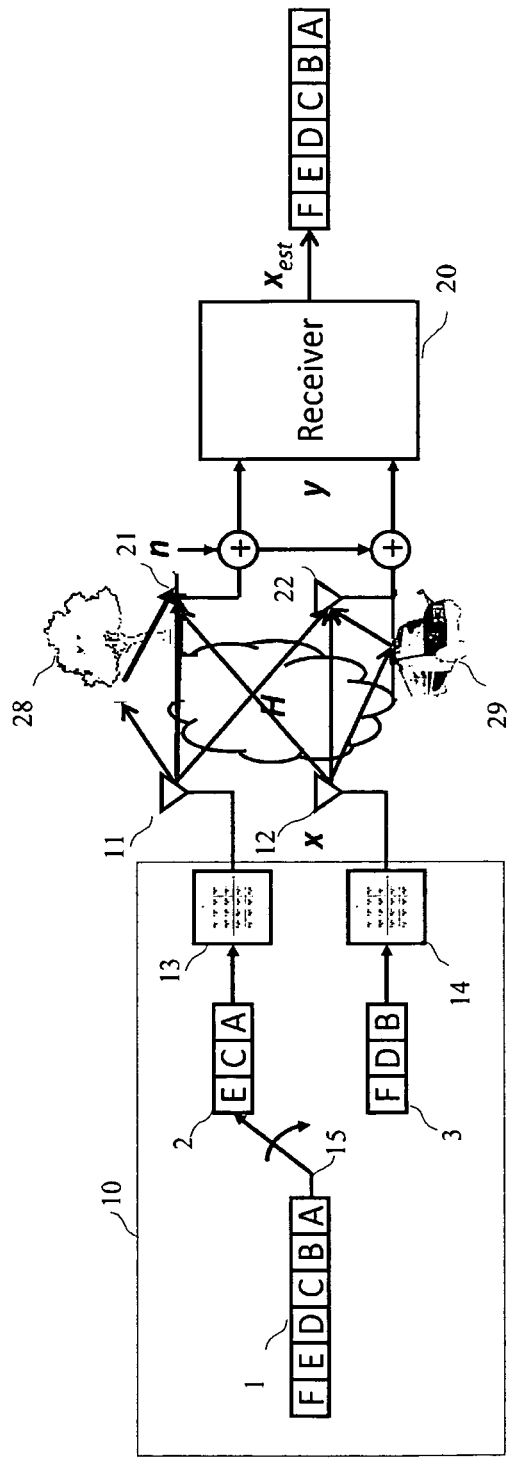
FIG. 1 illustrates a basic 2×2 multiple-Input Multiple-Output (MIMO) with a spatial multiplexing scheme.

The classical SD formula in Equation (1) is centred on the received signal y and the corresponding detector will be denoted in the following as the "nave" SD. In the case of a depth-first search algorithm, the Babai point is defined as the first solution that is given by the algorithm. The induced Babai point in this case is implicitly a Zero Forcing-Successive Interference Canceller (ZF-SIC). In the case of a Fixed Neighborhood Size Algorithm (FNSA), this definition is extended and is considered as the solution that would be directly reached, with no Neighborhood study. Another useful notation that has to be introduced is the sphere search centre $x_c$, namely the signal in any equation of the form $\|x_c-x\|^2 \leq d^2$, where x is any possible signal within the constellation, which is consistent with the equation of an $(n_T-1)$-sphere. The general idea relies on selecting an efficient search centre that induces an already close-to-optimal Babai point, in other words a solution that is already close to the ML solution. In particular, this solution would offer the ML diversity and a tiny SNR offset while it corresponds to a pseudo-linear equalization. This way, it is clear that the Neighborhood scan size can be decreased while reaching the ML estimate. In the case of a FNSA, since the Neighborhood size is fixed, it will induce a performance improvement for a given Neighborhood size or a reduction of the Neighborhood size for a given BER goal.

Thanks to the introduction of an equivalent metric described below, the idea evoked above may be applied. This possibility has been explored for the Minimum Mean Square Error (MMSE)-SIC Babai point with an Original Domain Neighborhood (ODN) $\xi^{n_T}$ study [2, 3, 4, 5]. Also, it has been implicitly done for the Lattice Reduction Aided (LRA)-ZF-SIC Babai point with a Reduced Domain Neighborhood (RDN) $Z_c^{n_T}$ study [1, 6]. This makes the layers in the symbols vector close to be independent and consequently reduce the interest of scanning a large Neighborhood in both the reduced and original domains to achieve the ML performance.

However, the computational complexity of the technique has been shown to be less efficient in the QPSK case, where the near-ML performance can be obtained at the price of a Neighborhood size of the order of the modulation size which is acceptable in the QPSK case. In addition, the RDN study is intricate, in particular in the set of possible neighbours' generation since the constellation in the reduced domain is unknown and infinite.

Consequently, there is now proposed to substitute to the known technique discussed in the above mentioned non published European patent application or to complete such technique by a new mechanism using the full diversity of LRA detectors while reducing the SNR offset through a Neighborhood study in the original domain.

The new technique that is proposed and described in detail below for a Sphere Decoder will be hereinafter designated as an ODN LRA-ZF FNSA. Also, the performance is still improved thought the equivalent metric introduction which was introduced by the above mentioned non published European patent application. Subsequently, the ODN LRA-MMSE FNSA is introduced.

In order to clarify the description of the process (II), some theoretical considerations will be introduced first (I).

I. Theoretical Considerations

In this first preliminary section, different possible sphere centres will be briefly evoked, in order to clearly present the contribution of the invention.

ZF(MMSE) Centre with a Neighborhood in the Original Constellation

Both the classical ZF FNSA [3] and MMSE FNSA [4] may be considered but offer poor performances with high modulation orders, unless at the price of a large Neighborhood study—and subsequently a large computational complexity—, even with the classical optimizations (Layer ordering [7], Symbol ordering [8], Dynamic K [9]).

LRA-ZF(MMSE) Centre with a Neighborhood in the Reduced Constellation

Subsequently, the LRA-ZF(MMSE) FNSA have been considered in the above mentioned European patent application [1] and offer very impressive hard-decision performance. However, even if the issue of the Neighborhood study in the reduced domain has been fully addressed, it remains very complicated and sensitive. In particular, numerous steps have to be added in the receptor, which increases the detector latency. Moreover, it does not offer a strong performance improvement in the QPSK case, due to an implicit constraint from the QPSK constellation construction that eliminates nearby lattice points that do not belong to $\xi^{n_T}$, through the quantization operation $Q_{\xi^{nT}}\{.\}$ [2]. However, it is fundamental to conserve the ML diversity of the LRA-detectors. A by-passed solution is consequently proposed and allow for the use of an efficient sphere centre, namely a LRA-ZF point, with a Neighborhood study in the original domain.

LRA-ZF Centre with a Neighborhood in the Original Constellation

The solution proposed by Zhang et. al. [5], and denoted as the Fixed Point Algorithm (FPA), is interesting in the sense that they provide a by-solution that does not need a study of a Neighborhood in the reduced domain by replacing z by $T^{-1}x$. However, the formula that they introduce is not equivalent to the ML metrics and consequently offers sub-optimal performance.

An original solution lies in providing an exact expression of the ML metrics that may simultaneously reads:

$$\hat{x}_{ML} = \underset{x \in \xi^{nT}}{\arg\min} \left\| \tilde{R}'(Tz_{LRA-ZF} - x) \right\|^2, \quad (2)$$

where $\tilde{R}'$ is the QRD output of $\tilde{R}T^{-1}$, making the Neighborhood study to be done in the original domain.

Proof:

$$\hat{x}_{ML} = \underset{x \in \xi^{nT}}{\arg\min} \|y - Hx\|^2$$

$$= \underset{x \in \xi^{nT}}{\arg\min} \|y - HTT^{-1}x\|^2$$

$$= \underset{x \in \xi^{nT}}{\arg\min} \|y - \tilde{H}z\|^2$$

$$= \underset{x \in \xi^{nT}}{\arg\min} \left\| \tilde{H}\tilde{H}^{-1}y - \tilde{H}z \right\|^2$$

$$= \underset{x \in \xi^{nT}}{\arg\min} \left\| \tilde{H}(\tilde{H}^{-1}y - z) \right\|^2$$

$$= \underset{x \in \xi^{nT}}{\arg\min} \left\| \tilde{H}(z_{LRA-ZF} - z) \right\|^2$$

$$= \underset{x \in \xi^{nT}}{\arg\min} \left\| \tilde{Q}\tilde{R}(z_{LRA-ZF} - z) \right\|^2$$

$$= \underset{x \in \xi^{nT}}{\arg\min} \left\| \tilde{R}(z_{LRA-ZF} - z) \right\|^2$$

$$= \underset{x \in \xi^{nT}}{\arg\min} \left\| \tilde{R}(z_{LRA-ZF} - T^{-1}x) \right\|^2$$

$$= \underset{x \in \xi^{nT}}{\arg\min} \left\| \tilde{R}(T^{-1}Tz_{LRA-ZF} - T^{-1}x) \right\|^2$$

$$= \underset{x \in \xi^{nT}}{\arg\min} \left\| \tilde{R}T^{-1}(Tz_{LRA-ZF} - x) \right\|^2$$

The principle is now to make all the x entries independent through the triangular shape of a QRD output:

$$\hat{x}_{ML} = \underset{x \in \xi^{nT}}{\arg\min} \left\| \tilde{Q}'\tilde{R}'(Tz_{LRA-ZF} - x) \right\|^2$$

$$= \underset{x \in \xi^{nT}}{\arg\min} \left\| \tilde{R}'(Tz_{LRA-ZF} - x) \right\|^2,$$

where $$[\tilde{Q}', \tilde{R}'] = QRD\{\tilde{R}T^{-1}\}.$$

While it can be noted that the QRD complexity of a quasi-triangular matrix may be reduced compared to a classical QRD, it is not addressed in the present invention.

LRA-MMSE Centre with a Neighborhood in the Original Constellation

The next idea is to choose a closer-to-ML Babai point than the ZF-SIC, which is the case of the MMSE-SIC solution.

For sake of clearness with definitions, we say that two ML equations are equivalent if the lattice points argument output of the minimum distance are the same, even in the case of different metrics. Two ML equations are equivalent if:

$$\arg\min_{x \in \xi^{nT}} \{\|y - Hx\|^2\} = \arg\min\{\|y - Hx\|^2 + c\}, \quad (3)$$

where c is a constant.

Through an equivalent metric introduction and similarly to the demonstration that has been provided in [1], a novel formula can be proposed:

$$\hat{x}_{ML} = \underset{x \in \xi^{nT}}{\arg\min} \left\| \tilde{R}'(Tz_{LRA-ZF} - x) \right\|^2 \quad (4)$$

Where $\tilde{R}^H\tilde{R} = \tilde{H}^H\tilde{H} + \sigma^2 T^H T$ and $\tilde{R}' = QRD\{\tilde{R}T^{-1}\}$. Again, it can be noticed that the Neighborhood study is processed in the original domain, namely $\xi^{nT}$. The reader should also note that (4) considers the unconstrained LRA-MMSE estimate, thus there is no quantization in the reduced domain either.

Since it is based on the mechanism disclosed in the above mentioned European patent application [1], the technique advantageously consists in the possibility of bypassing, in the SD, the Neighborhood study in the reduced domain, if necessary. Consequently, the presented solution in (4) is original and leads to large computational complexity reduction of the RDN LRA-MMSE FNSA. For the sake of consistency, this solution is denoted ODN LRA-MMSE FNSA.

Also, the sake of comparability, the FPA algorithm has been extended to the MMSE case.

The different elementary blocks-diagrams illustrated in FIG. 2-8 will now be introduced the alternative RDN and ODN processes, in the perspective of the description of a whole comprehensive process taking advantage of both RDN-based and ODN-based studies.

Figure 2:
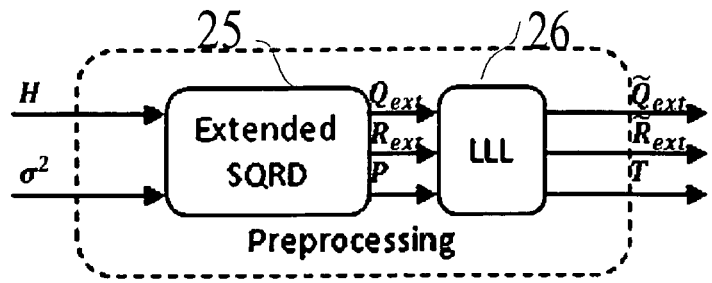
FIG. 2 illustrates the Block-diagram of the pre-processing step of both the ODN and RDN LRA-FNSA.
Figure 3:
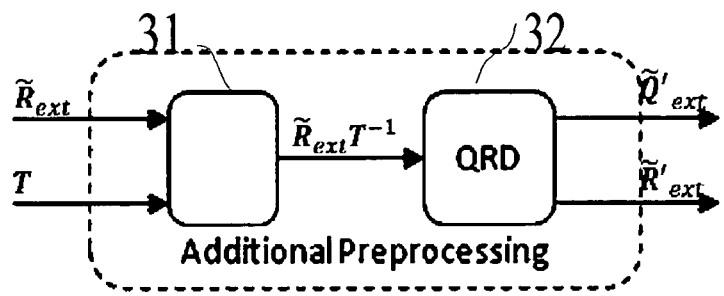
FIG. 3 illustrates the Block-diagram of the additional pre-processing step, of the ODN LRA-FNSA only.
Figure 4:
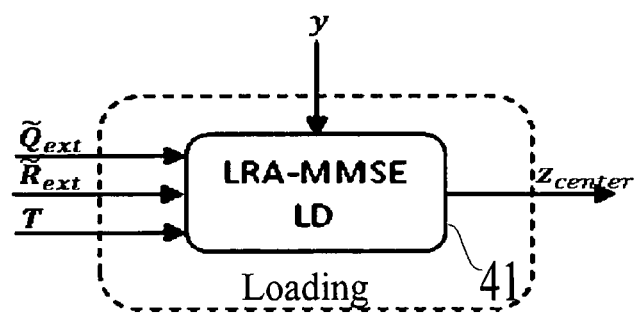
FIG. 4 illustrates the Block-diagram of the loading step of both the ODN and RDN LRA-FNSA.
Figure 5:
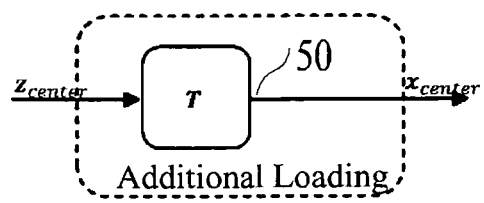
FIG. 5 illustrates the Block-diagram of the loading step of the ODN LRA-FNSA.
Figure 6:
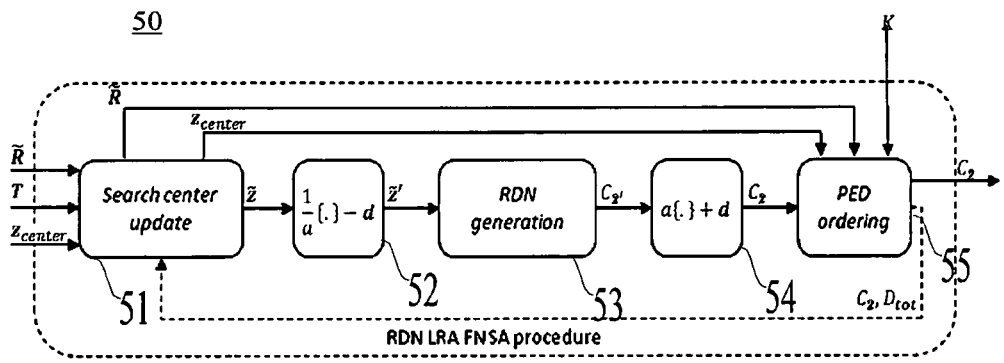
FIG. 6 illustrates the Block-diagram of the detection step of the RDN LRA-FNSA.
Figure 7:
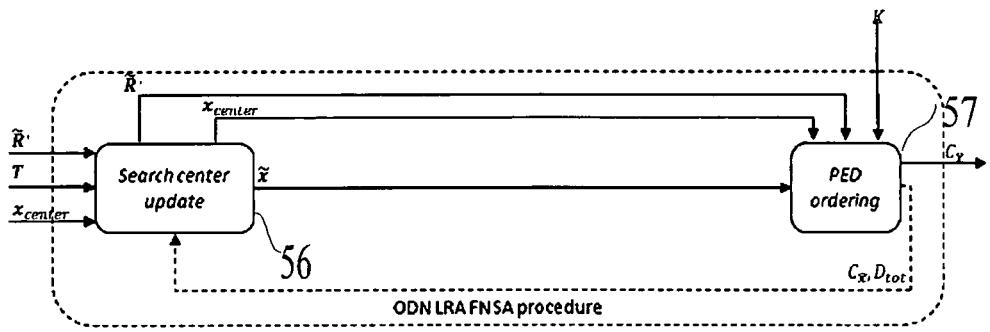
FIG. 7 illustrates the Block-diagram of the detection step of the ODN LRA-FNSA.
Figure 8:
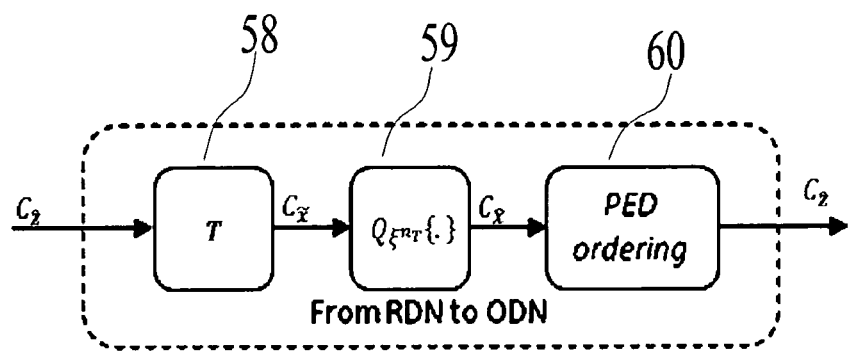
FIG. 8 illustrates the Block-diagram of the final step of the RDN LRA-FNSA.

In particular, FIGS. 2-3 address the pre-processing steps, FIGS. 4-5 treat the initialization process and FIGS. 6-8 depict the strictly speaking detection stage.

FIG. 2 illustrates the Block-diagram of the pre-processing step which is basically common to both the ODN and RDN LRA-ZF/MMSE FNSA. The extended step SQRD performed by block 25 aims at providing a convenient starting point of the LLL step carried out by block 26 in the sense that it induces a strong computational complexity reduction of both its mean and variance. Subsequently, it lies on the SQRD output including the permutation matrix P. The LLL block output offer—among others—a "better" conditioned $\tilde{R}$ matrix, and T includes both the permutations in the SQRD processing and the swapping-reduction operations in the LR algorithm processing.

FIG. 3 more particularly illustrates the additional preprocessing step which is involved in the sole case of the ODN LRA-FNSA only. One sees that the additional pre-processing step consists in the multiplication of $\tilde{R}_{ext}$ and $T^{-1}$ after inversion (block 31) that can even be directly done inside of the LLL algorithm for the sake of computational complexity reduction). An additional QRD is then processed by block 32.

FIG. 4 illustrates the Block-diagram 41 of the initialization step of both the ODN and RDN LRA-ZF/MMSE FNSA. One sees that by considering the receive vector y, the unconstrained LRA-MMSE Linear Detector (LD) is applied. This block-diagram is general, and can eventually be used in order to generate the unconstrained LRA-ZF LD although it does not offer any advantage.

FIG. 5 illustrates the Block-diagram 50 of the initialization step of both the ODN and RDN LRA-ZF/MMSE FNSA. From (4) and in order to remain the metrics exact, the unconstrained LRA-MMSE estimate in the reduced domain is switched back to the original constellation, simply by multiplying it by T.

FIG. 6 illustrates the Block-diagram of the detection step of the RDN LRA-ZF/MMSE FNSA, which comprises a block 51 for updating the search centre by considering first the unconstrained LRA-ZF/MMSE LD estimate. Then, a scaling-shifting operation is applied by a block 52, and the RDN generation is processed by means of a block 53 through a SE strategy around the updated search centre. Subsequently, a deshifting-descaling operation is carried out in block 54 for switching back from the reduced constellation. In the last block 55, the PEDs are calculated then ordered such as only K surviving candidates are stored at each layer. Again, the K best solutions are stored and re-injected at the beginning of the block scheme until the whole transmit vector has been detected.

FIG. 7 illustrates the Block-diagram of the detection step of the ODN LRA-ZF/MMSE FNSA. Similarly to FIG. 6, FIG. 7 offers a Neighborhood study by considering any search centre performed in a block 56, which can thus be combined with a unique PED ordering block 57. In particular, all the other blocks shown in FIG. 6 have been removed, such as the RDN generation since in the original domain the Neighborhood is known in advance. The ODN LRA-ZF/MMSE FNSA output already belong to the original constellation, which is not the case of the RDN LRA-ZF/MMSE FNSA.

FIG. 8 illustrates the Block-diagram of the final step of the RDN LRA-ZF/MMSE FNSA. One sees that the set of possible solutions in the reduced domain is switched back to the original constellation by means of a block 58, leading to a set of possible solutions in the original domain. Due to the ODN generation issues, this set can possibly lead to non-existing symbols vectors, which induces the use of the quantification operator (block 59) that constrain the symbols to existing ones. In particular, the case of symbols that lies outside of the constellation bounds is considered. Finally, the PED are ordered in the original constellation by means of a block 60. Thus the hard-estimate is provided by considering the path with the lowest Euclidean distance.

All the FIGS. 1, 2, 4 and 6 have been particularly described in the above mentioned non published European patent application. Again, the RDN generation block is very sensitive since it consists in generating a set of Neighborhood in the reduced constellation that is not known in advance, due to the matrix T that mixes each entries of x. Worse than everything: the constellation is infinite, which would dramatically increase the computational complexity, without reaching the optimal ML estimate in the case of an incorrect calibration.

For the purpose of eliminating the Neighborhood study in the reduced domain, there is suggested to introduce an additional QRD that make the X entries at the bottom layer independent of others. Finally, it allows for decoding the remaining entries iteratively by subtracting the previously detected symbols contribution, similarly to a solving system.

For the sake of clarity, the evoked RDN-based algorithms is depicted in FIG. 11 showing a MATLAB representation.

A new technique is particularly proposed in the algorithm of FIG. 12, the principle lying on the fact the RDN LRA-ZF (MMSE) FNSA can be replaced by a less complex ODN LRA-ZF(MMSE) FNSA when such replacement is shown to be appropriate.

As it is depicted in the step 3 of the Algorithm of FIG. 12, an additional step appears. Namely, the QRD of $\tilde{R}T^{-1}$ must be processed. The reason has been presented during the introduction of (2). This step depends on the channel realization only, and thus is not necessarily processed for each transmit symbols vector.

DESCRIPTION OF PRACTICAL EMBODIMENTS

1) First Embodiment

Figure 9:
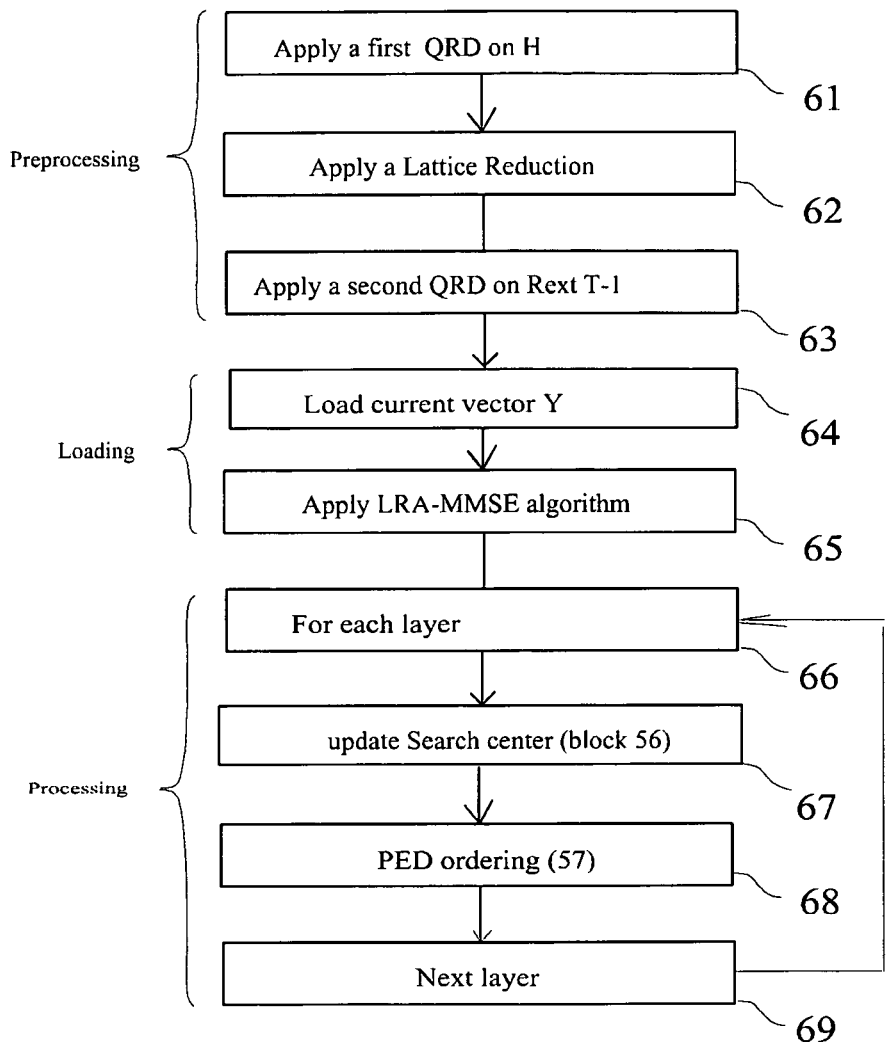
FIG. 9 illustrates a first embodiment of a process for performing a ODN LRA-SF (MMSE) FNSA.

One will now describe with respect to FIG. 9 one first embodiment of a process for carrying out a detection in the Original Domain Neighborhood (ODN), based on a Lattice Reduction aided (LRA) MMSE detection, involving the different functional blocks of FIGS. 2-8.

As described above, the particular embodiment successively involves a preprocessing phase (A)—only depending on the channel —, then followed by an loading phase (B) for processing the received observations and then completed by a phase of neighborhood search (C) within the Original Domain Neighborhood (ODN) for the purpose of achieving the detection.

A. Preprocessing

The preprocessing phase starts with the assumption of the knowledge of the channel H which can be determined by any conventional means, such as for instance by the use of pilot or reference signals.

Also, it is assumed that the variance of the noise ($\sigma^2$) is known.

Such parameters may be determined, for instance, after the receipt of a frame of symbols and can be repeatedly performed as soon as the channel varies.

The process then starts with a step 61 which consists in an QRD decomposition as illustrated by functional block 25 of FIG. 2, in accordance with any conventional means, that is to say a decomposition of the channel into two $Q_{ext}$ and $R_{ext}$ matrices, with $Q_{ext}^H Q_{ext} = I$ (matrix identity) and $R_{ext}$ being upper triangular. In one particular embodiment, the QRD decomposition is a SQRD decomposition which is particularly applied to a $H_{ext}$ channel a having a dimension $(n_R+n_T) \times n_T$ which takes into account the noise contribution, that is to say according to the model below from the formula:

$$H_{ext} = \begin{bmatrix} H \\ \sigma I \end{bmatrix}$$

and $$y_{ext} = \begin{bmatrix} y \\ 0 \end{bmatrix}..$$

With $y_{ext}$ having a dimension $n_R+n_T$.

More particularly, the SQRD decomposition is a sorted QRD decomposition, with the rows of said upper triangular matrix that are sorted in accordance with the level of the Signal-to-Interference and Noise Ratio (SINR), said SQRD decomposition issuing $Q_{ext}$, $R_{ext}$ and a permutation matrix P.

Step 61 then results in the generation of the following three parameters: $Q_{ext}$, $R_{ext}$, and P, with P being a permutation matrix showing from the bottom to the top the symbols having the best signal to noise ratio. This particular arrangement reduces the propagation of the errors since the R matrix will be used for detecting first the symbols showing the best signal to noise ratio.

The SQR Decomposition is particularly discussed in document "Near-Maximum-Likelihood Detection of MIMO Systems using MMSE-Based Lattice-Reduction," D. Wubben, R. Böhnke, V. Kühm, and K.- D. Kammeyer, Communications, IEEE Internationa/Conference on, vol. 2, pp. 798-802, 2004), Then the process proceeds to a step 62 where a lattice reduction is applied for the purpose of improving the conditioning of the two components ($Q_{ext}$, $R_{ext}$) of the channel matrix.

For that purpose, the embodiment uses more particularly the Korkine-Zolotareff or Lenstra-Lenstra-Lovasz (LLL) algorithm as illustrated by block 26 of FIG. 2. More preferably, the LLL algorithm is used for deriving both T and $T^{-1}$ matrixes.

Step 62 thus issues the following variables $\tilde{Q}_{ext}$, $\tilde{R}_{ext}$, T and $T^{-1}$ with T being a transformation matrix which takes into account the permutations already accounted with matrix P, plus the additional changes resulting from the lattice reduction.

The process then proceeds with a step 63 where a second QR decomposition is applied on the $\tilde{R}_{ext}T^{-1}$ so as to produce the two matrixes $\tilde{Q}'_{ext}$ and $\tilde{R}'_{ext}$ This completes the pre-processing phase which only takes into account the H channel.

B. Loading Phase

The so-called loading phase includes the processing of a determined number n of observation vectors y, with n depending on how varies the channel H. Generally speaking, when H is subject to fast variations (for instance because the mobile is moving within the cell), then the number n of observations will be reduced so as to allow more frequent update of the channel. Conversely, if the channel shows to be quite stable, then the number of observations Y to be loaded with the results of a same preprocessing phase A may be increased. Many variations may be considered for determining the proper number of observations to be considered during phase B. For instance, the consideration of the number of positive or negative acknowledgment may be used for determining whether the channel is rapidly changing, thus resulting in the need of initiating a new preprocessing phase. Such particular aspect is not part of the present invention and will not be further elaborated.

The loading phase starts with a step 64, where the process proceeds with the loading of the current observation vector y.

Then, in a step 65, the process proceeds with the execution of a Linear detection which, in the particular embodiment being considered is based on a Lattice Reduction aided MMSE algorithm, as shown by functional block 41 of FIG. 4.

In one particular embodiment, the linear detection is based on a linear equalization.

The use of the LRA-MMSE linear detection yields an value $x_{center}$, which can then be used for the purpose of completing the detection process.

C. Processing Phase (Search of Neighborhood in the ODN)

The third phase corresponds to the end of the so-called LOADING phase, and starts the real detection process. While the second phase was simply based on a linear detection or equalization, that means the multiplication by a matrix, phase C now leads to a detection of the transmitted symbol.

As described in Wubben et al evoked above, the detection is based taking advantage of the triangular shape of the R matrix in the second QR Decomposition—on the use of a Successive Interference Canceller (SIC) for achieving quantification and thus the detection process.

Conversely, the embodiment which is now described deviates from that conventional teaching in that a neighborhood search is investigated in order to yield a predetermined number of possible symbols.

More particularly, in the embodiment which is considered, the result of phase B above is used for deriving the search center for the neighborhood search.

Step 66 is the start of a FOR loop for the purpose of processing all the layers of the received symbols.

In a step 67, the process performs a search center update as illustrated by block 56 of FIG. 7 which particularly takes into account the value of the previous step 65 yielding $x_{center}$ and also the result of the previous iteration on the last layers.

Then, in a step 68, the process proceeds with the PED ordering within, the Original Domain Neighborhood (ODN), for the purpose of selecting of a predetermined number K of the integers giving the small PED distance, hereinafter designated as the K-best solutions.

In one alternative embodiment, the process directly generates a list of ordered symbols giving increasing PED value, so that the selection of the K-best solutions is simply based on the generation of the first K values of the ordered list.

Different algorithms can be used for the purpose of generating the K-best, such as, for instance the so-called SCHNORR-EUCHNER algorithm.

In one particular embodiment, the process generates a set of 10 K-best possible integers per layer.

Then, in a step 69, the process proceeds to the processing of the next layer, and loops back to step 66 again.

When the set of n observations vectors has been processed, then the process initializes a again for the purpose of performing a new pre-processing of the next frame.

2) Second Embodiment

Figure 10:
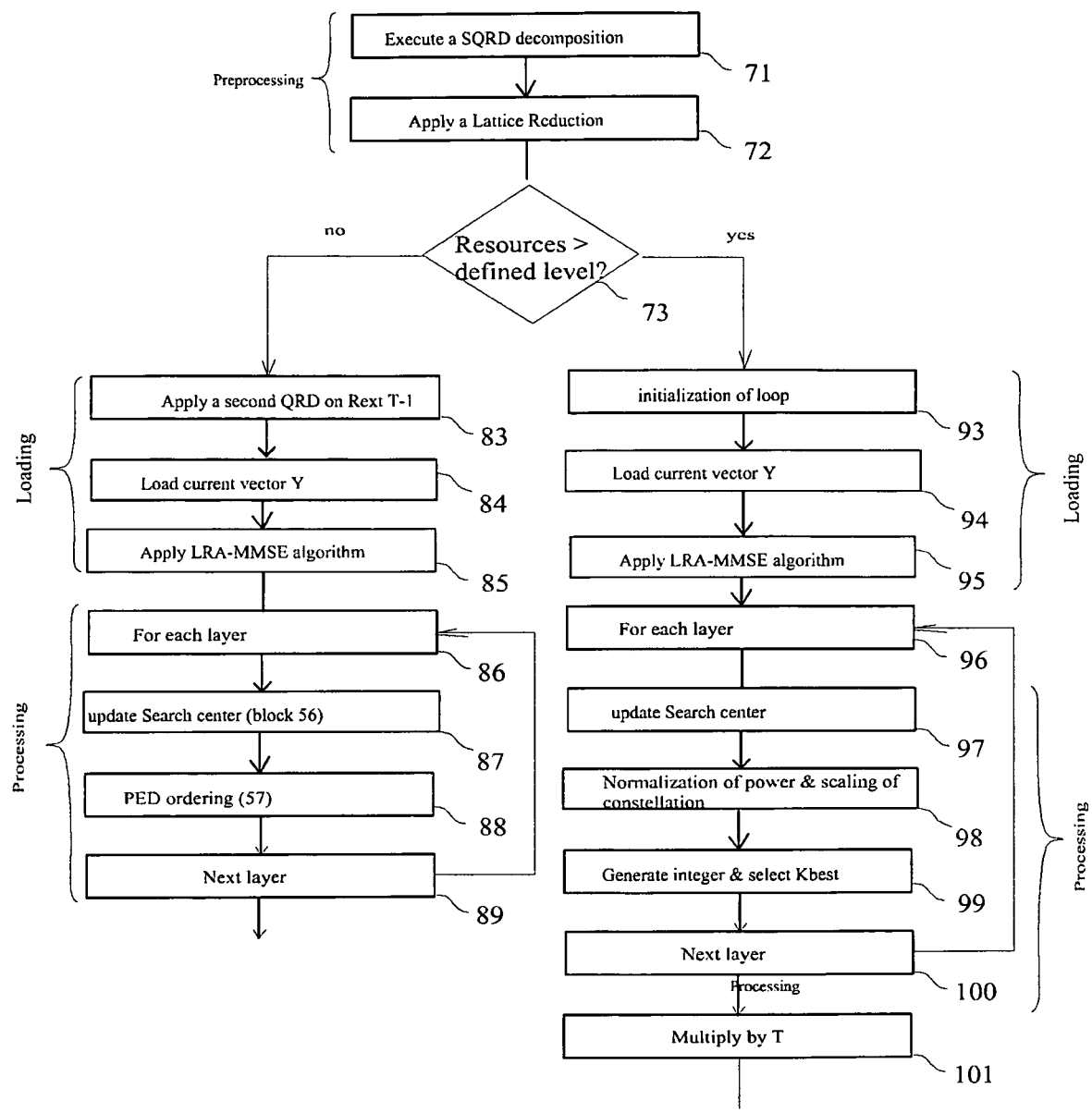
FIG. 10 illustrates a second embodiment of a process taking advantage of both a ODN LRA-ZF(MMSE) FPA FNSA and a RDN LRA-ZF(MMSE) FPA FNSA in accordance with the digital resources available in the system.
Figure 13A:
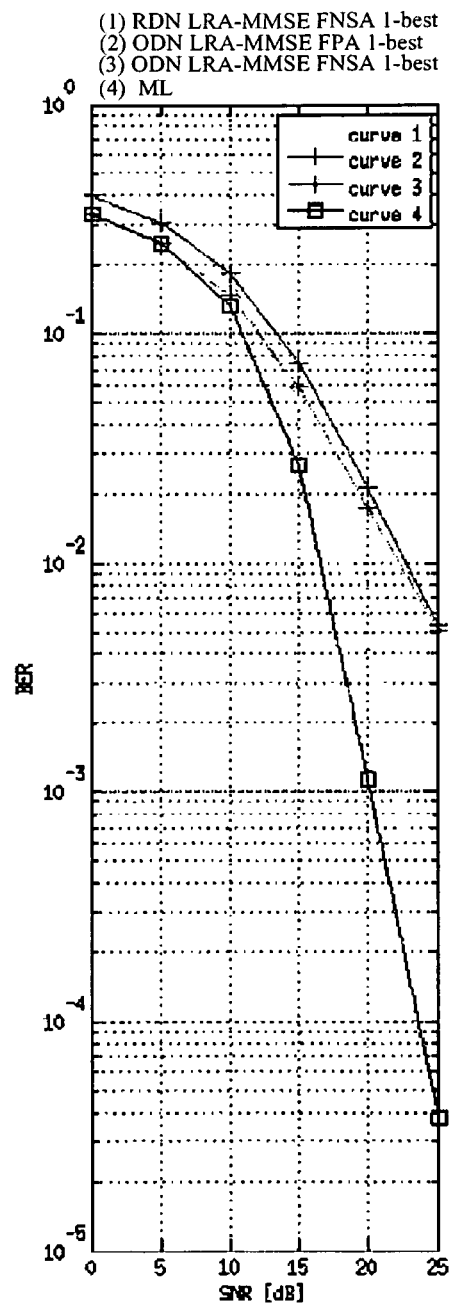
FIGS. 13a to 13d respectively illustrate Uncoded BER of the RDN LRA-MMSE FNSA, of the ODN LRA-MMSE FNSA, of the ODN LRA-MMSE FPA and of the reference ML, for K={1, 2, 3, 4}, 4×4 complex Rayleigh channel, QPSK modulation on each layer.
Figure 13B:
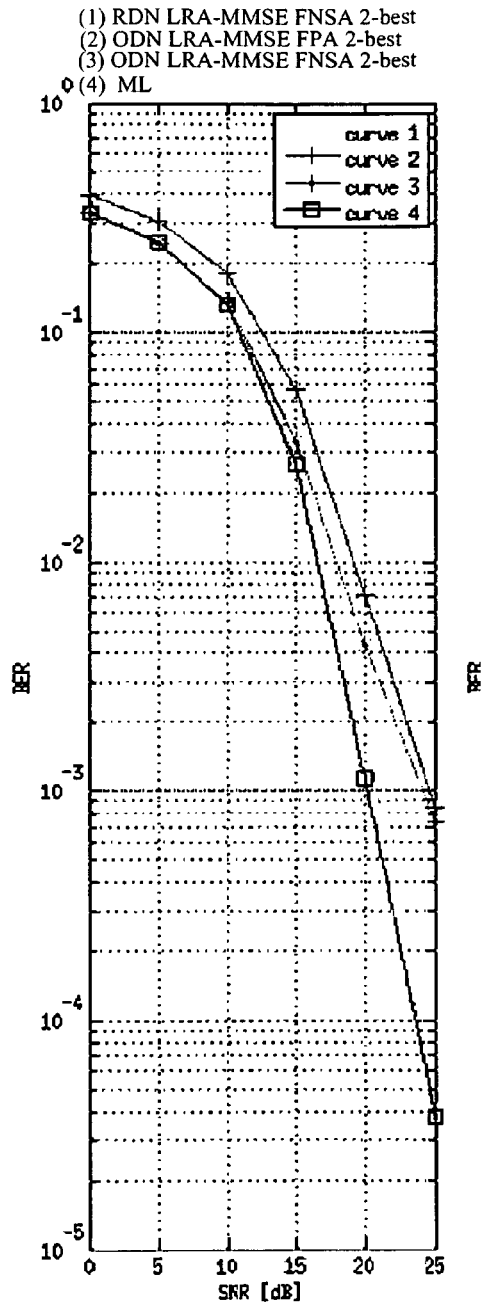
Figure 13C:
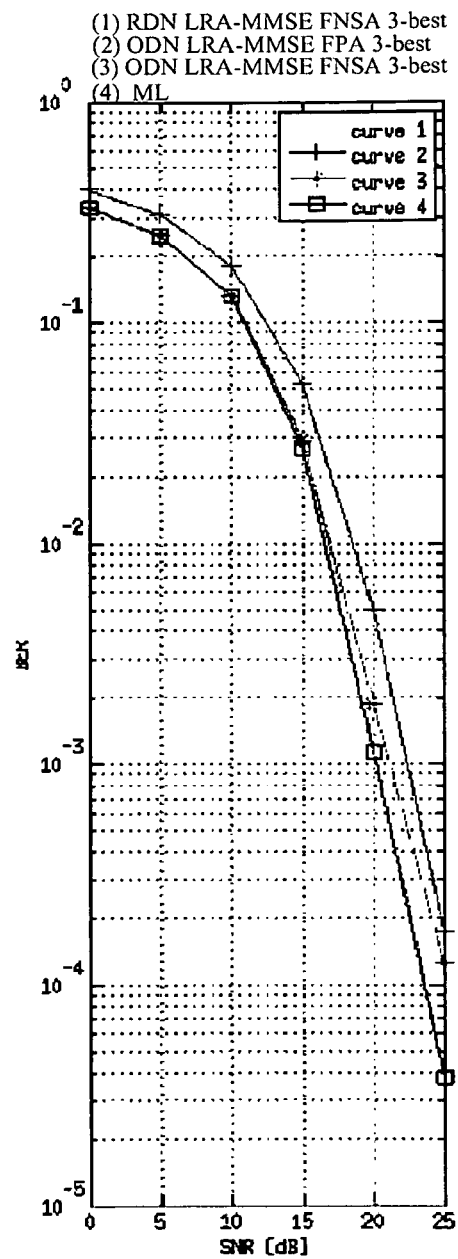
Figure 13D:
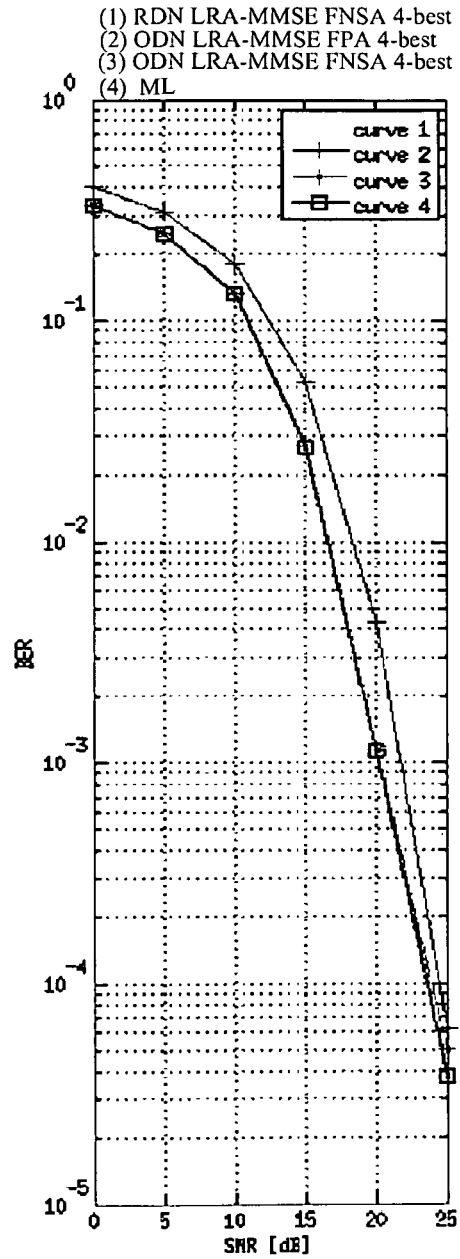
Figure 14A:
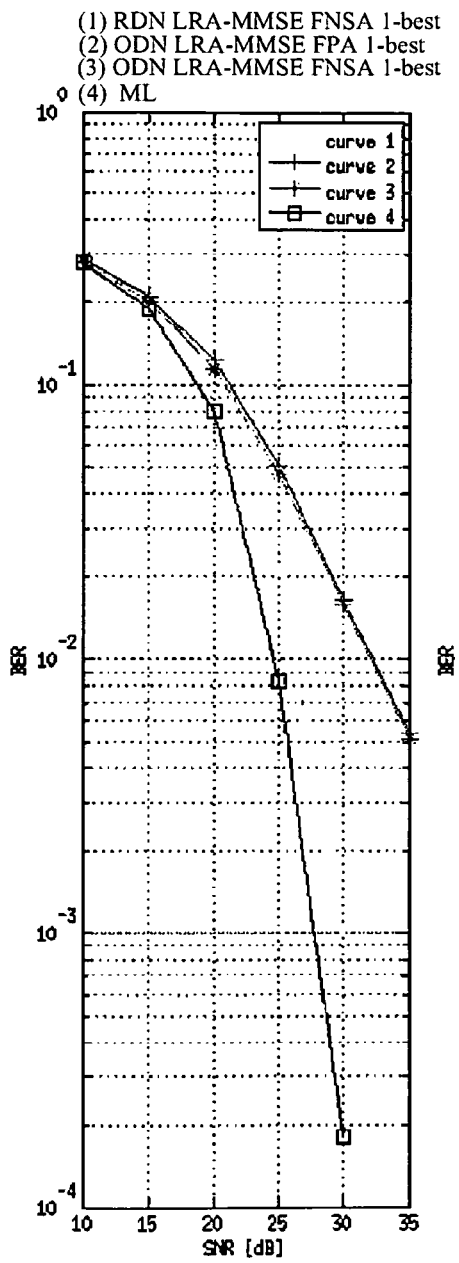
FIGS. 14a to 14d respectively illustrate Uncoded BER of the RDN LRA-MMSE FNSA, of the ODN LRA-MMSE FNSA, of the ODN LRA-MMSE FPA and of the reference ML, for K={1, 2, 4, 16}, 4×4 complex Rayleigh channel, 16-QAM modulation on each layer.
Figure 14B:
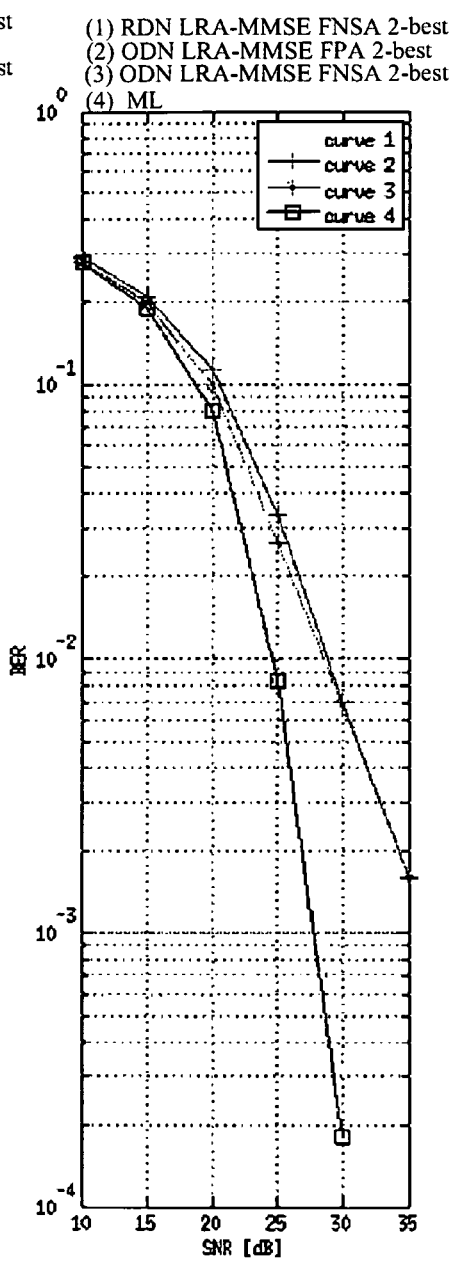
Figures 14C, 14D:
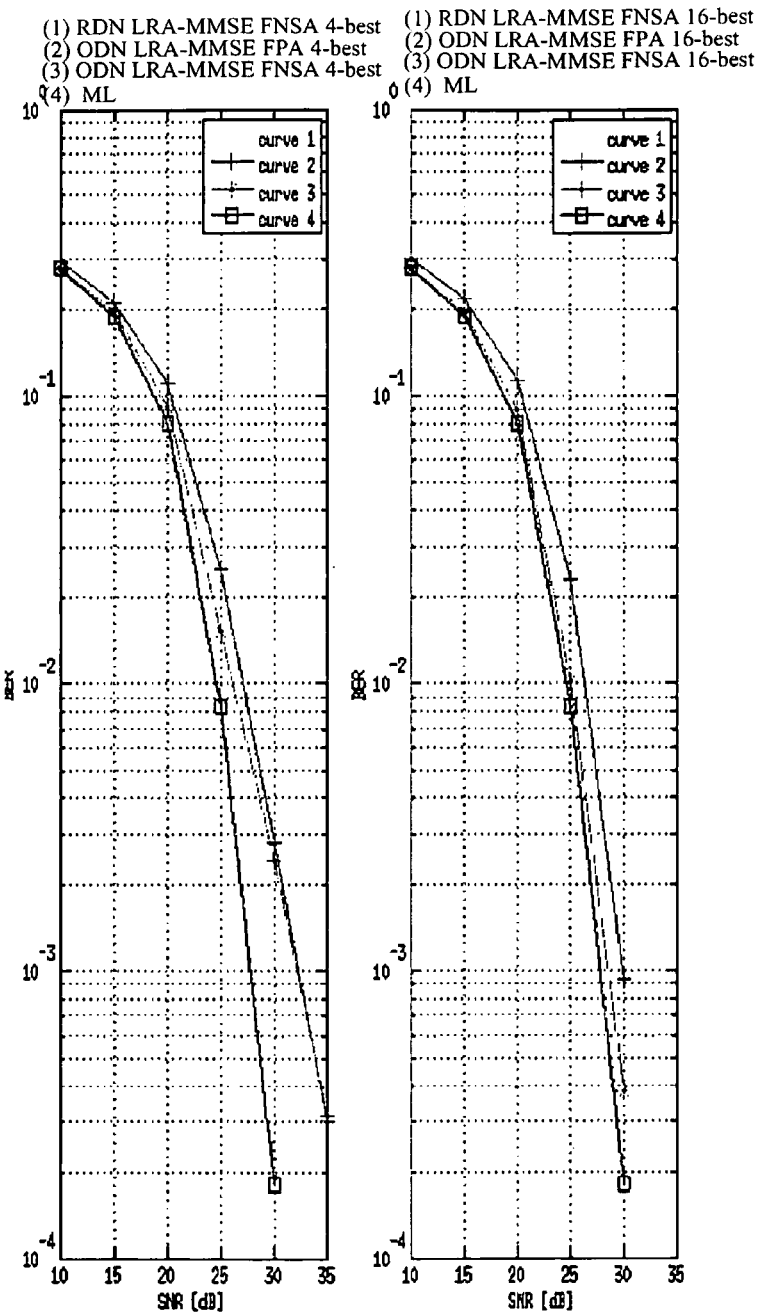

With respect to FIG. 10, there will now be described how the two RDN and ODN mechanisms can be combined for the purpose of achieving a highly effective detection process which takes into account the level of resources available in the receiver.

A. Preprocessing Phase

The process starts with a step 71 consisting in the first QRD decomposition which was described in reference to step 61 of FIG. 9, yielding the three parameters: $Q_{ext}$, $R_{ext}$, and P.

Then, in a step 72, the process applies, similarly to the step 62, a lattice reduction in order to generate the following matrices $\tilde{Q}_{ext}$, $\tilde{R}_{ext}$, T and $T^{-1}$ with T being a transformation matrix which takes into account the permutations already accounted with matrix P, plus the additional changes resulting from the lattice reduction.

Then a test is performed in a step 73 for the purpose of determining whether the level of digital resources is superior to a predetermined level.

If the resources show to be inferior to the predetermined levels, then the process executes the steps 83 to 89 which are similar to step 63-69 described above, and which have the aim of carrying out a LRA-aided MMSE detection process based on the Original Domain Neighborhood (ODN).

On the contrary, in the case where the level of the resources available in the receiver show to be superior than the predetermined level, then the process proceeds to the execution of process steps 93-101 which consists in the RDN LRA-MMSE detection described in the above mentioned European patent application, and which is summarized hereinafter:

B. Loading Phase

The so-called loading phase comprises steps 93-95 involving the processing of a determined number n of observation vectors y, with n depending on how varies the channel H.

Le loading phase starts with a step 93, which is the initialization of a loop for the purpose of loading successive observations, e.g. a set of n vectors Y.

Then, in a step 94, the process proceeds with the loading of the current observation vector y.

Then, in a step 95, the process proceeds with the execution of a Linear equalization which, in the particular embodiment being considered is based on a Lattice Reduction aided MMSE algorithm, designated as follows:

$$\tilde{z}_{LRA\text{-}MMSE}$$

C. Processing Phase (Search of Neighborhood)

The third phase corresponds to the end of the so-called LOADING phase, and starts the real detection process. While the second phase was simply based on a linear equalization, that means the multiplication by a matrix, phase C now leads to a detection of the transmitted symbol.

In the Wuebben's article, the detection is based—taking advantage of the triangular shape of the R matrix in the QR decomposition—on the use of a Successive Interference Canceller (SIC) for achieving quantification and thus the detection process.

Conversely, the embodiment which is now described deviates from that conventional teaching in that a neighborhood search is investigated in order to yield a predetermined number of possible symbols.

More particularly, in the embodiment which is considered, the result of phase B above is used for deriving the search center for the neighborhood search.

This results in the fact that the search is no longer performed in the original constellation, but is executed in "z" constellation resulting from a lattice reduction while WANG, in FIG. 1 of the above mentioned reference, starts the search from the result of x̃.

Step 96 is the start of a FOR loop for the purpose of processing all the layers of the received symbols.

In a step 97, the process performs a search center update which particularly takes into account the value of the previous step 95 yielding $\tilde{z}_{LRA\text{-}MMSE}$ and also the result of the previous iteration on the last layers.

Then, in a step 98, a shift and divide operation is applied on the value of the search center so as to achieve basic normalization of the power and scaling of the constellation.

Then, in a step 99, the process proceeds with the generation, for each layer, of all symbols to be investigated. Thanks to the previous shift-normalization step, such generation is based on the consideration of integers around the sphere center. The process then generates a list of integers and the computation of the partial Euclidean Distance with respect to the considered Sphere Center $\tilde{z}_{LRA\text{-}MMSE}$, in accordance with the formula:

$$\|\tilde{R}(\tilde{z}_{LRA\text{-}MMSE}-z)\|^2 < d^2$$

with R̃| being the upper triangular matrix resulting from the QR decomposition and lattice reduction (thus in the RDN), z being the symbol vector to be detected within the RDN; and d being the sphere constraint within the reduced domain.

The above generation of integer causes the selection of a predetermined number K of the integers giving the small PED distance, hereinafter designated as the K-best solutions.

In one alternative embodiment, the process directly generates a list of ordered symbols giving increasing PED value, so that the selection of the K-best solutions is simply based on the generation of the first K values of the ordered list.

Different algorithms can be used for the purpose of generating the K-best, to such as, for instance the so-called SCHNORR-EUCHNER algorithm.

In one particular embodiment, the process generates a set of 10 K-best possible integers per layer.

Then, in a step 100, the process proceeds to the processing of the next layer, and loops back to step 96 again.

When all the layers have been computed, then the process proceeds to a step 101 where the estimated value ẑ is multiplied by the matrix T so as to generate the estimated value x̂ after quantization.

When the set of n observations vectors has been processed, then the process initializes again for the purpose of performing a new pre-processing of the next frame.

Conclusions on Performances

The RDN LRA-MMSE FNSA described in the above mentioned European patent application [1] relates, is particularly efficient in the case of rank-deficient MIMO Systems—namely spatially correlated antennas systems—and for high order modulation which are considered points of the LTE-A norm [10]. However, the performance gain is poor in the QPSK case. This observation is due to the existence of an implicit constraint from the QPSK constellation construction that eliminates nearby lattice points that do not belong to $\xi^{nT}$, due to the quantization operation $Q_{\xi^{nT}\{\cdot\}}$. This aspect annihilates a large part of the LR-Aid benefit and cannot be corrected despite the increase of the Neighborhood study size since many lattice points considered in the RDN would be associated with the same constellation point after quantization in the original constellation. In such a case, the Neighborhood study in the original domain and around the unconstrained LRA-MMSE solution, to which this invention relates, is computationally advantageous while offering near-ML performance.

The performance results are directly provided with any LRA-MMSE-based detectors. While it was not the case and for the sake of comparison, the FPA has been extended to the LRA-MMSE case, which is denoted as LRA-MMSE FPA.

FIGS. 13*a* to 13*d* respectively illustrate Uncoded BER of the RDN LRA-MMSE FNSA, of the ODN LRA-MMSE FNSA, of the ODN LRA-MMSE FPA and of the reference ML, for K={1, 2, 3, 4}, 4×4 complex Rayleigh channel, QPSK modulation on each layer. Some notable points have to be highlighted from such figure. Contrary to both the RDN LRA-MMSE FNSA and the ODN LRA-MMSE FNSA, the ODN LRA-MMSE FPA does not reach the ML diversity for a reasonable Neighborhood size, even if there is a decrease of the SNR offset. It is due, as previously introduced, to the use non-exact metrics.

In both FIGS. 13*a-d* and FIGS. 14*a-d*, one sees that all the depicted techniques achieve the ML diversity at the price of a very large Neighborhood study size, namely of the order of the number of symbols contained in the employed constellation. Moreover, a SNR offset remains in the case of the ODN LRA-MMSE FPA, while the ML performance is reached with both the RDN LRA-MMSE FNSA and ODN LRA-MMSE FNSA.

Complexity Considerations

By assuming the assumptions presented in FIG. 15, the computational complexities introduced in Table 5 of FIG. 16 can be demonstrated. The RDN study is processed in an infinite lattice which would not lead to boundary control; however a finite set of displacements has been generated in a SE fashion in simulations. Its size has been fixed to an empirical value (N=5) and, although the use of a SE technique, the proposed solution does not any complexity reduction like early termination.

As exhibited in the table of FIG. 16, the computational complexities of RDN LRA-ZF(MMSE) FNSAs do not depend on the constellation order $\log_2\{M\}$. It may be checked in the numerical applications in Table 7 and it is the key point of the invention [1] advantage over classical techniques for high order modulations such as 16(64)-QAM.

Overview of all the Aforementioned Techniques

For sake of clearness, the metrics computation formulas are summarized in Table of FIG. 17.

The SNR loss compared to ML are given in FIG. 18. They have been measured for an uncoded BER of $10^{-4}$ in the case of the ML decoder. The performances are directly given in the case of both RDN and ODN LRA-MMSE detectors that have been shown to provide a performance improvement compared to naive ones [1]. The superiority of the RDN LRA-MMSE FNSA has been shown in [1], thus it is used as a reference in order to exhibit the advantage of the proposed technique. Despite of its poor performance results, the ODN LRA-MMSE FPA is also considered.

For all the configurations given in FIG. 18, the numerical application of the corresponding computational complexity is given in the table of FIG. 19 for a RDN size N=5.

As presented in [1], the superiority of the RDN LRA-MMSE FNSA is clear in high modulation orders. Namely, it offers a strong computational complexity decrease compared to ODN-based detectors while achieving near-ML performance in the use of 16AM modulations at each layer. In particular, a SNR offset of 0.28 dB at a BER of $10^{-4}$ is observed for a three times cheaper computational complexity, while no less than 0.97 dB can be obtained with an ODN-based detector with such a calibration.

The interesting point in the use of the proposed solution concerns low modulation orders. Namely, it offers a strong computational complexity decrease compared to the RDN-based detector while achieving near-ML performance in the use of QPSK modulations at each layer. In particular, a SNR offset of 0.33 dB at a BER of $10^{-4}$ is observed for a two times cheaper computational complexity compared to the computational cost of the RDN-based detector that provides SNR offset of 0.18 dB.

Advantage of the Processes Described:

Any OFDM standard supporting MIMO spatial-multiplexing mode, e.g. IEEE 802.16, IEEE 802.11, 3GPP LTE and 3GPP LTE-A, are linked to the invention. The invention, associated with the invention in [1] is particularly advantageous in the case of a large number of antennas and consequently in the case of the 3GPP LTE-A standard.

The proposed solution outperforms the invention proposed in [1] in the QPSK case. Consequently, the pre-processing steps are almost the same for both the ODN-based and RDN-based techniques, leading to an efficient re-use of the available resources. The invention provides an advantage over competition in the popular MIMO-OFDM background:

- A novel metric expression has been presented, aiming at providing a near-ML estimate through an efficient sphere centre that relies on a Lattice-Reduction preprocessing while by-passing the issue offered by a Neighborhood study in the reduced domain, which has not been done before;
- A SIC procedure has been employed at each layer once the sphere centre has been selected;

The quasi-optimum performance can be achieved with the embodiments being described.

REFERENCES

[1] S. Aubert, "<<Detection process for a receiver of a wireless MIMO communication system>>", European patent application 10368044.3 filed on 30 Nov. 2010
[2] B. M. Hochwald, and S. Ten Brink, "Achieving near-capacity on a multiple-antenna channel," *Communications, IEEE Transactions on*, vol. 51, no. 3, pp. 389-399, March 2003.
[3] K.-W. Wong, C.-Y. Tsui, S.-K. Cheng, and W.-H. Mow. "A VLSI Architecture of a K-Best Lattice Decoding Algorithm For MIMO Channels," *Circuits and Systems, IEEE International Symposium on*, vol. 3, pages 273-276, May 2002.
[4] L. Wang, L. Xu, S. Chen, and L. Hanzo, "MMSE Soft-Interference-Cancellation Aided Iterative Center-Shifting K-Best Sphere Detection for MIMO Channels," *Communications, IEEE International Conference on*, pp. 3819-3823, May 2008.
[5] W. Zhang, and X. Ma, "Approaching Optimal Performance By Lattice-Reduction Aided Soft Detectors," Information Sciences and Systems, Conference on, pp. 818-822, March 2007.
[6] X.-F. Qi, and K. Holt, "A Lattice-Reduction-Aided Soft Demapper for High-Rate Coded MIMO-OFDM Systems," *Signal Processing Letters, IEEE*, vol. 14, no. 5, pp. 305-308, May 2007.
[7] D. Wübben, R. Böhnke, J. Rinas, V. Kühn, and K.-D. Kammeyer, "Efficient Algorithm for Decoding Layered Space-Time Codes", *Electronics Letters, IEEE*, vol. 37, no 22, pp. 1348-1350, October 2001.
[8] C. Schnorr, and M. Euchner, "Lattice basis reduction: improved practical algorithms and solving subset sum problems", *Mathematical Programming*, vol. 66, pp. 181-199, September 1994.
[9] L. G. Barbero, and J. S. Thompson, "Fixing the Complexity of the Sphere Decoder for MIMO Detection", Wireless Communications, IEEE Transactions on, vol. 7, no 6, pp. 2131-2142, June 2008.
[10] E.-U. Technical Specification Group RAN, "36.101 User Equipment (UE) radio transmission and reception v8.8.0," Tech. Rep., September 2009.

The invention claimed is:

1. A detection process for a receiver of a wireless communication system based on Multiple-Input Multiple-Output antennas comprising $n_T$ transmitting antennas and $n_R$ receiving antennas, said receiver processing observations symbol vector y derived from symbol vector x transmitted by an emitter through a channel H; comprising:
   a preprocessing phase which only depends on a channel matrix H, said preprocessing phase involving:
   a first QR decomposition for the purpose of decomposing said channel H into two $Q_{ext}$ and $R_{ext}$ matrices, with $Q_{ext}^H Q_{ext}=I$ and $R_{ext}$ being upper triangular;
   a lattice reduction phase for the purpose of generating $\tilde{Q}_{ext}$, $\tilde{R}_{ext}$ and a transformation matrix T based on said matrices $Q_{ext}$ and $R_{ext}$;
   a second QR decomposition applied on a matrix $\tilde{R}_{ext}T^{-1}$ for the purpose of generating two matrices $\tilde{Q}'_{ext}$ and $\tilde{R}'_{ext}$;
   a loading phase comprising a linear detection process of the observations y for the purpose of generating a value $x_{center}$ said linear detection being based on said matrices $\tilde{Q}'_{ext}$ and $\tilde{R}'_{ext}$ and on permutation matrix T resulting from said lattice reduction; and a neighborhood search performed in an Original Domain Neighborhood corresponding to an original constellation $\xi^{n_T}$ of transmitted symbols x with a search center being equal to the result $x_{center}$ of said loading phase, said neighborhood search determining a limited number of symbols according to a K-best algorithm, said K-best algorithm being based on a minimization of the formula:

$$\hat{x}_{ML} = \underset{x \in \xi^n T}{\operatorname{argmin}} \left\| \tilde{R}'(Tz_{LRA-ZF} - x) \right\|^2.$$

2. The detection process according to claim 1 wherein said first QR decomposition is a sorted QR decomposition which is particularly applied to a $H_{ext}$ channel having a dimension $(n_R+n_T) \times n_T$ which takes into account a noise contribution, according to the model below from the formula:

$$H_{ext} = \begin{bmatrix} H \\ \sigma I \end{bmatrix}$$

and $$y_{ext} = \begin{bmatrix} y \\ 0 \end{bmatrix}.$$

with $y_{ext}$ having a dimension $n_T$, σ being a variance of noise and I being an identity matrix and said first sorted QR decomposition generating a permutation matrix P ordering a layer in accordance to noise level.

3. The detection process according to claim 1 wherein said linear detection is based on a linear MMSE equalization.

4. The detection process according to claim 1 wherein said lattice reduction is based on a Korkine-Zolotareff or Lenstra-Lenstra-Lovasz algorithm, generating the following matrices:

$\tilde{Q}_{ext}$, $\tilde{R}_{ext}$, T and $T^{-1}$ with T being a transformation matrix which takes into account the permutations already accounted with matrix P, plus the additional changes resulting from the lattice reduction.

5. A user equipment comprising a receiver including means for performing the process defined in claim 1.

6. A receiver for a wireless communication system based on Multiple-In-Multiple-Out antennas comprising $n_T$ transmitting antennas and $n_R$ receiving antennas, said receiver processing observations symbol vector y derived from symbol vector x transmitted by an emitter through a channel matrix H comprising:

preprocessing means comprising:
  means for performing a first QR decomposition for the purpose of decomposing said channel matrix H into two $Q_{ext}$ and $R_{ext}$ matrices, with $Q_{ext}^H Q_{ext} = I$ and $R_{ext}$ being upper triangular;
  means for performing a lattice reduction for the purpose of generating $\tilde{Q}_{ext}$, $\tilde{R}_{ext}$ and a transformation matrix T based on said matrices $Q_{ext}$ and $R_{ext}$;
  means for performing a second QR decomposition applied on a matrix $\tilde{R}'_{ext} T^{-1}$ for the purpose of generating two matrices $\tilde{Q}'_{ext}$ and $\tilde{R}'_{ext}$;
  means for performing a loading phase comprising a linear detection process of the observations y for the purpose of generating a value $x_{center}$, said linear detection being on said matrices $\tilde{Q}_{ext}$ and $\tilde{R}_{ext}$ and on permutation matrix T resulting from said lattice reduction; and means for performing a neighborhood search performed in an Original Domain Neighborhood corresponding to an original constellation $\xi^{n_T}$ of transmitted symbol x with a search center being equal to the result $x_{center}$ of said loading phase, said neighborhood search determining a limited number of symbols according to a K-best algorithm, said K-best algorithm being based on a minimization of the formula:

$$\hat{x}_{ML} = \underset{x \in \xi^n T}{\operatorname{argmin}} \left\| \tilde{R}'(Tz_{LRA-ZF} - x) \right\|^2.$$

7. The receiver according to claim 6 wherein said first QR decomposition is a sorted QR decomposition which is particularly applied to a $H_{ext}$ channel having a dimension $(n_R+n_T) \times n_T$ which takes into account a noise contribution, according to the model below from the formula:

$$H_{ext} = \begin{bmatrix} H \\ \sigma I \end{bmatrix}$$

and $$y_{ext} = \begin{bmatrix} y \\ 0 \end{bmatrix}.$$

with $y_{ext}$ having a dimension $n_R+n_T$, σ being a variance of noise and I being an identity matrix and said first sorted QR decomposition generating a permutation matrix P ordering a layer in accordance to a noise level.

8. The receiver according to claim 6 wherein said linear detection is based on a linear MMSE equalization.

9. The receiver according to claim 6 wherein said lattice reduction is based on a Korkine-Zolotareff or Lenstra-Lenstra-Lovasz algorithm, generating the following matrices:

$\tilde{Q}_{ext}$, $\tilde{R}_{ext}$, T and $T^{-1}$ with T being a transformation matrix which takes into account the permutations already accounted with matrix P, plus the additional changes resulting from the lattice reduction.

10. A detection process for a receiver of a wireless communication system based on Multiple-In-Multiple-Out antennas comprising $n_T$ transmitting antennas and $n_R$ receiving antennas, said receiver processing observations symbol vector y derived from symbol vector x transmitted by an emitter through a channel H; comprising:

a preprocessing which only depends on the channel H, said preprocessing involving:
  a first QR decomposition for the purpose of decomposing said channel H into two $Q_{ext}$ and $R_{ext}$ matrices, with $Q_{ext}^H Q_{ext} = I$ and $R_{ext}$ being upper triangular;
  a lattice reduction for the purpose of generating $\tilde{Q}_{ext}$, $\tilde{R}_{ext}$ and a transformation matrix T;
determining whether said receiver includes processing power being superior to one predetermined level;
if said processing power is superior to said predetermined level, then executing the process involving the steps of:
  applying a second QR decomposition applied on a matrix $\tilde{R}_{ext} T^{-1}$ for the purpose of generating two $\tilde{Q}'_{ext}$ and $\tilde{R}'_{ext}$;
  a loading phase comprising a linear detection process of the observations y for the purpose of generating a value $x_{center}$, said linear detection being based on said matrices $\tilde{Q}_{ext}$ and $\tilde{R}_{ext}$ and on permutation matrix T resulting from said lattice reduction;

a neighborhood search performed in an Original Domain Neighborhood corresponding to an original constellation $\tau^{n_T}$ of transmitted symbols x with a search center being equal to the result $x_{center}$ of said loading phase, said neighborhood search determining a limited number of symbols according to a K-best algorithm, said K-best algorithm being based on a minimization of the formula:

$$\hat{x}_{ML} = \underset{x \in \xi^{n_T}}{\operatorname{argmin}} \|\tilde{R}'(T\tilde{z}_{LRA-ZF} - x)\|^2;$$

otherwise executing the process involving the steps of:
  a loading phase comprising the linear detection applied on said symbol y in accordance with the result of said lattice reduction for the purpose of generating a value $\tilde{z}_{LRA-MMSE}$
  applying a neighborhood search with a search center being equal to the result $\tilde{z}_{LRA-MMSE}$ of said lattice reduction;
  determining K-Best symbols in accordance with a Partial Euclidean Distance defined in accordance with the following formula:

$$\|\tilde{R}(\tilde{z}_{LRA-MMSE} - z)\|^2 < d^2$$

detecting each layer and with the result of said detection performing an update of the search center so as to perform detection of the next layer; and
  multiplying an estimated value $\hat{z}$ by matrix T so as to generate the estimated value $\hat{x}$ through an additional quantization step in the original constellation $\xi^{n_T}$.

11. The detection process according to claim 10 wherein it involves said preprocessing phase is applied on an extended model of matrix H defined in accordance with the following formula:

$$H_{ext} = \begin{bmatrix} H \\ \sigma I \end{bmatrix}$$

and $$y_{ext} = \begin{bmatrix} y \\ 0 \end{bmatrix}.$$

with H being a channel matrix, σ being noise standard deviation, I being an identity matrix.

12. The detection process according to claim 11 wherein said lattice reduction is based on a Korkine-Zolotareff or Lenstra-Lenstra-Lovasz algorithm.

13. The detection process according to claim 10 further involving a sorted QRD decomposition, with the rows of said upper triangular matrix that are sorted in accordance with the level of the Signal-to-Interference and Noise Ratio affecting the symbol y, said sorted QR decomposition issuing $Q_{ext}$, $R_{ext}$ and a permutation matrix P.

14. The detection process according to claim 13 wherein said lattice reduction algorithm generates the following output $\tilde{Q}_{ext}$, $\tilde{R}_{ext}$, and T with T being a transformation matrix which takes into account the permutations already accounted with matrix P, plus the additional changes resulting from the lattice reduction step.

15. The detection process according to claim 14 further comprising the use of the value of $\tilde{z}_{LRA-MMSE}$ for the purpose of deriving a search center for a neighborhood search with a selection of the K-Best symbols; and
  a shift and divide operation is applied on the value of the search center so as to achieve basic normalization of power and scaling of the original constellation $\xi^{n_T}$;
  the generation of a sorted list of symbols associated with the K smallest PEDs, said sorted list being generated by studying a neighborhood in accordance with the SCHNORR-EUCHNER algorithm;
  the determination of an estimated value $\hat{z}$, and
  the multiplication of the estimated value $\hat{z}$ by matrix T plus a quantization step for the purpose of generating estimated value $\hat{z}$.

* * * * *